United States Patent

Micheron

[11] 4,354,134
[45] Oct. 12, 1982

[54] PIEZOELECTRIC ACCELERATION PICKUP WITH A POLYMER TRANSDUCER MEMBER

[75] Inventor: François Micheron, Paris, France
[73] Assignee: Thomson-CSF, Paris, France
[21] Appl. No.: 163,191
[22] Filed: Jun. 26, 1980
[30] Foreign Application Priority Data
  Jun. 29, 1979 [FR] France ............... 79 16897
[51] Int. Cl.³ .................................. H01L 41/22
[52] U.S. Cl. ........................ 310/800; 310/328; 73/517 R; 179/110 A
[58] Field of Search ........... 310/800, 324, 326, 329, 310/338, 321, 327; 179/110 A, 114, 115 R, 115 ES; 181/171, 174

[56] References Cited
U.S. PATENT DOCUMENTS
  1,772,163  8/1930  Squyars .................. 181/174
  2,963,911 12/1960  Courtney-Pratt et al. ..... 73/517
  4,051,395  9/1977  Taylor ................... 310/329

Primary Examiner—Arthur T. Grimley
Assistant Examiner—D. L. Rebsch
Attorney, Agent, or Firm—Oblon, Fisher, Spivak, McClelland & Maier

[57] ABSTRACT

Piezoelectric acceleration pickup incorporating a transducer film made from a polymer material which, after treatment, has piezoelectric properties, two electrodes and a seismic mass provided by an excrescence on the polymer film, the assembly being obtained in one operation by moulding. According to a second variant, the pickup is in the form of an elongated object obtained by moulding a polymer material and in which are embedded two facing planar electrodes, the polymer material between these two electrodes constituting the transducer member and the material above these electrodes constituting the seismic mass.

8 Claims, 8 Drawing Figures

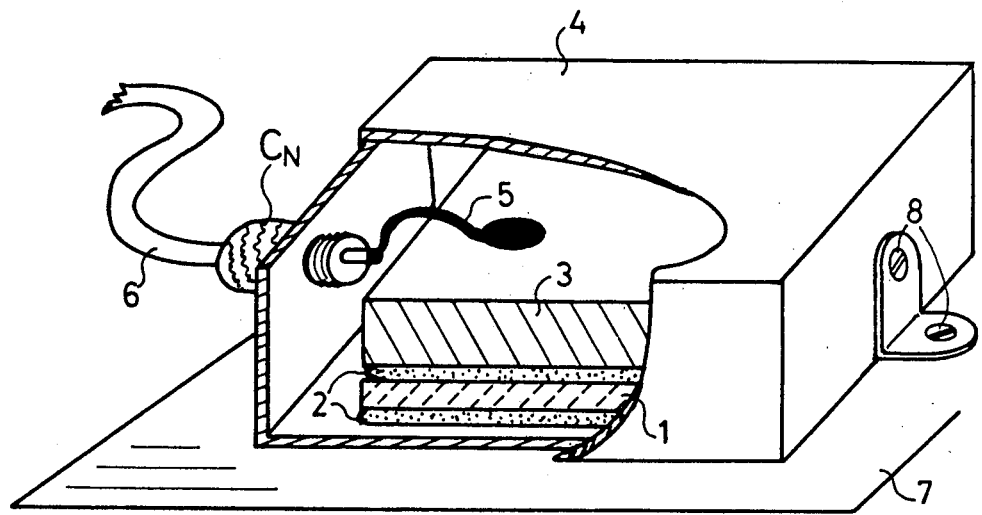
PRIOR ART Fig. 1
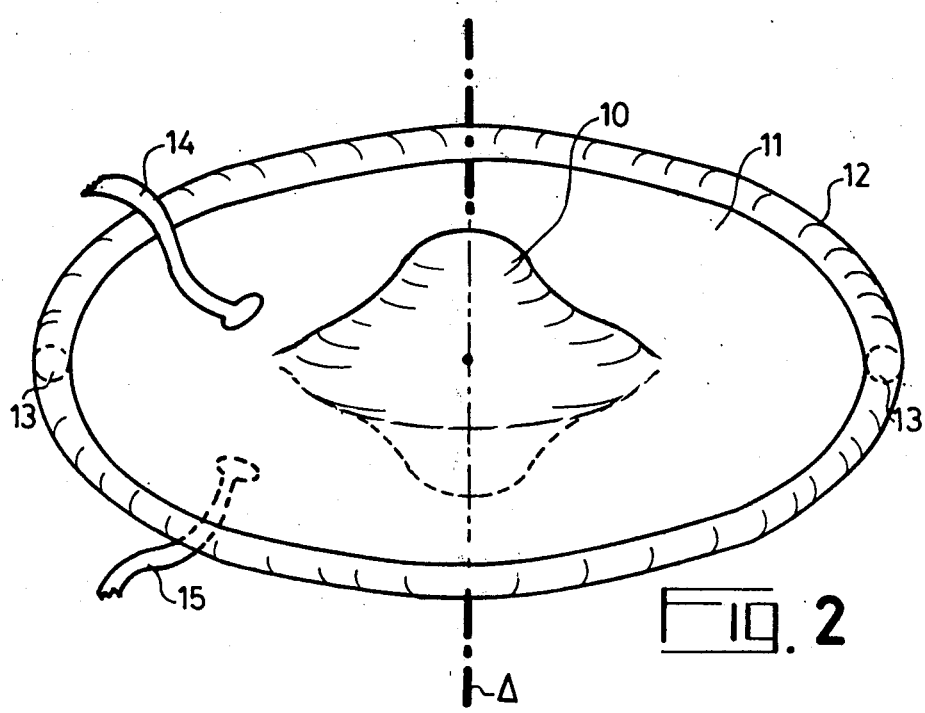
Fig. 2

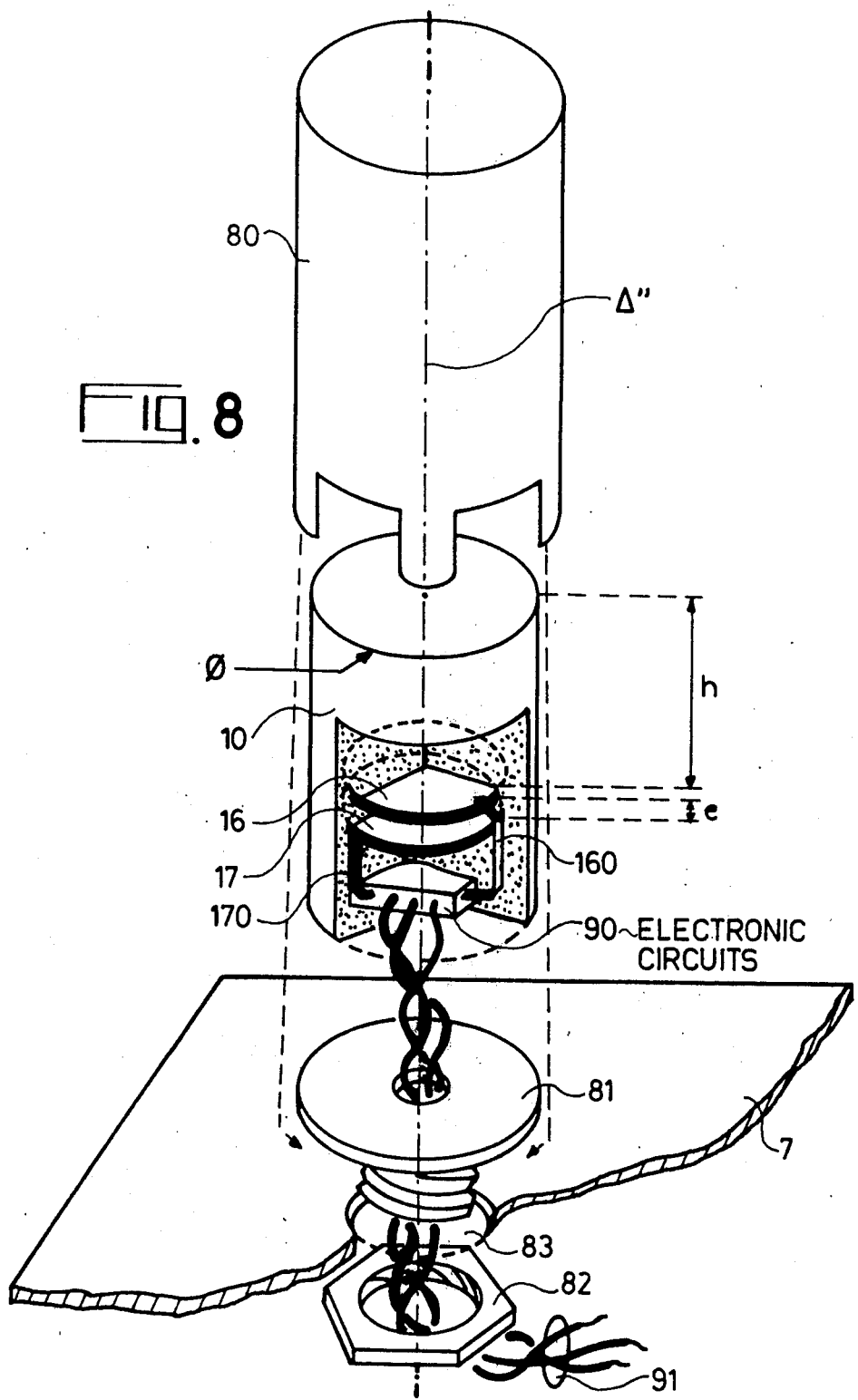

4,354,134

PIEZOELECTRIC ACCELERATION PICKUP WITH A POLYMER TRANSDUCER MEMBER

BACKGROUND OF THE INVENTION

The present invention relates to a piezoelectric acceleration pickup with a polymer transducer member.

Conventionally, a piezoelectric acceleration pickup has two main components. The first component is a piezoelectric transducer in the form of a flat member, wherein one face is fixed to the case containing the pickup, whilst the second component is a mass M, called the seismic mass, which is fixed to the other face of the transducer member. The overall arrangement is such that under the effect of an acceleration g, the mass M exerts a force Mg on the piezoelectric member which then supplies to a measuring circuit a charge quantity proportional to Mg, i.e. to g, M being known.

The prior art piezoelectric material was generally a polarized ferroelectric ceramic having a high piezoelectric coefficient d (expressed in coulomb/Newton). The response of these pickups is dependent on the temperature. The piezoelectric type material can be a ferroelectric monocrystal or even monocrystalline quartz when maximum importance is attached to the independence of the output voltage of the pickup with respect to the temperature. Pickups made by means of these materials and in particular the two latter types of materials are expensive. Moreover, certain pickups supply very low amplitude output signals, necessitating complex electronic matching and amplification circuits which contribute to increasing the price thereof.

Recently, piezoelectric polymers have become available, whose piezoelectric coefficients d are intermediate between those of quartz (1 to 5 $10^{-12}$ C $N^{-1}$) and those of ferroelectrics (100 to 500 $10^{-12}$ C $N^{-1}$). As a non-limitative example, reference is made to polyvinylidene fluoride (PVF$_2$: d=10 to 20 $10^{-12}$ C.$N^{-1}$), polyvinylidene fluoride/polytetrafluoroethylene copolymer (PVF$_2$-PTFE: d=5 to 10 $10^{-12}$ C $N^{-1}$), polyvinylchloride (PVC: d=1 to 5 $10^{-12}$ C $N^{-1}$) and polyvinylfluoride (PVF: d=2 to 7 $10^{-12}$ C $N^{-1}$). These polymers are made piezoelectric after shaping and melting by maintaining a temperature which is typically between 80° and 120° C. under applied electrical fields of 500 kV/cm to several MV/cm and polarization times between a few minutes and a few hours. The polymer is then brought to ambient temperature under an electrical field (e.g. in 30 minutes).

These polymer materials have the advantage of being very inexpensive and can be moulded into random shapes. However, for numerous applications and in particular for the general public, the need has arisen for a very inexpensive acceleration pickup. As non-limitative examples, reference is made to the detection of unbalance in rotary machines of the centrifuge type (e.g. the drum of washing machines) or the detection of shocks or impacts (e.g. shocks on closing doors), the detection of impacts between vehicles and obstacles, etc.

BRIEF SUMMARY OF THE INVENTION

The present invention therefore relates to an acceleration pickup incorporating a polymer transducer member which has piezoelectric properties after undergoing an appropriate treatment, at least in the polymer material regions between two conductive electrodes at the terminals of which a voltage develops which is displaceable and related to the displacement of a seismic mass subject to an acceleration to be detected, wherein the seismic mass is constituted by at least one predetermined region of the polymer material.

BRIEF DESCRIPTION OF THE DRAWINGS

The invention is described in greater detail hereinafter relative to non-limitative embodiments and the attached drawings, wherein show:

FIG. 1 diagrammatically, a prior art acceleration pickup.

FIGS. 2 to 4 a first embodiment according to a first variant of a pickup according to the invention.

FIG. 8 an embodiment according to a second variant of a pickup according to the invention.

DETAILED DESCRIPTION OF THE PREFERRED EMBODIMENTS

Figure 3:
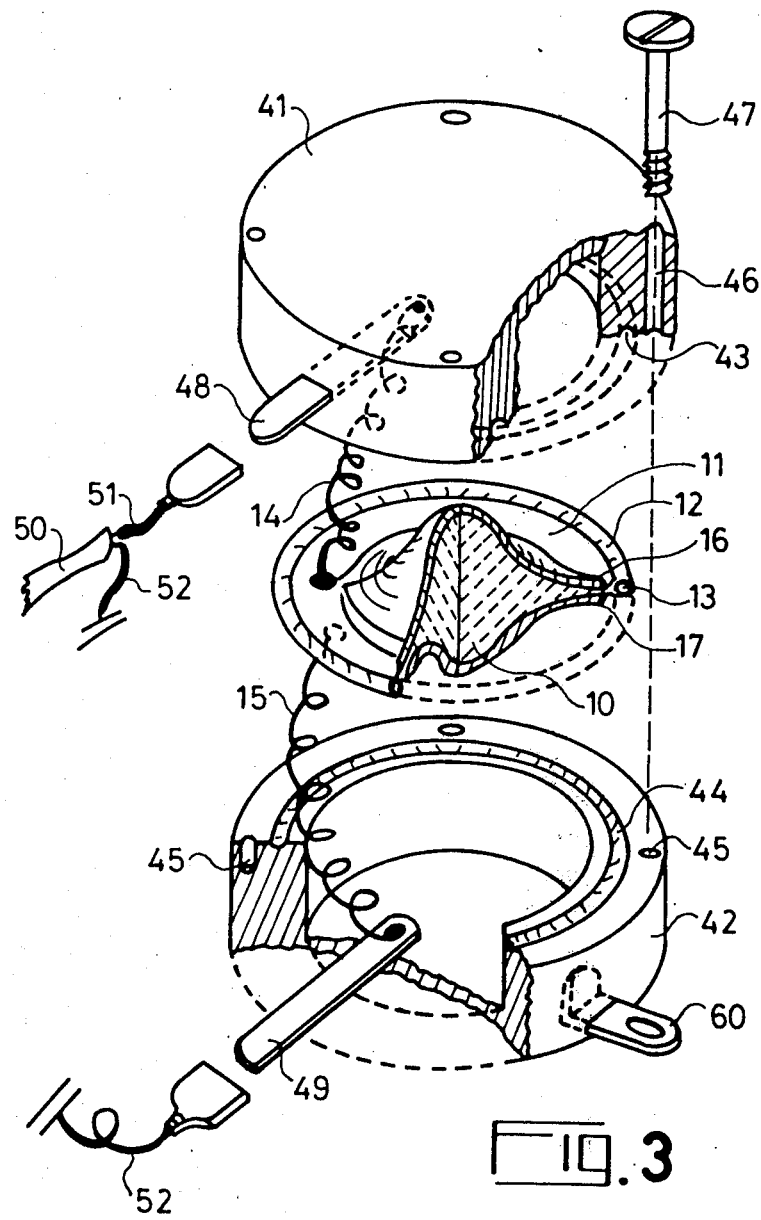

Hereinafter, elements which are common to two or more drawings carry the same reference numerals and will be described once only.

FIG. 1 diagrammatically illustrates the configuration used in the construction of prior art acceleration pickups. A transducer member 1 in the form of a thin piezoelectric material plate is fixed to a case 4, for example by means of conductive glue, the wall or case 4 forming a first electrode. A seismic mass 3, for example made from conductive material, is placed on transducer 1 by gluing with the same conductive glue 2. When the case is fixed by appropriate fixing means 8 to an apparatus or object, subject to or generating vibrations, a voltage is produced between the electrodes respectively formed by the seismic mass 3 and the inner wall of case 4. This voltage is collected between, on the one hand a welded connection 5 on seismic mass 3 and on the other the actual case. By means of connector $C_N$ and output cables 6 (e.g. a coaxial cable) the signals collected at the terminals of transducer 1 are transmitted to an appropriate measuring apparatus.

The invention makes it possible to integrate into a single member the transducer 1 of FIG. 1 and also the seismic mass 3. Moreover, as the material used is a polymer, this material is very inexpensive and lends itself to any desired moulding operation.

FIG. 2 illustrates a first embodiment of an acceleration pickup according to the invention and specifically a first variant thereof. A film made by moulding from a polar polymer material, e.g. chosen from among those referred to hereinbefore or from among the following materials: polychlorotrifluoroethylene, polyvinylfluoride/polytetrafluoroethylene or a composite chlorinated polyethylene having as its constituents polyethylene, polyvinylchloride or polyvinylidene chloride. The circular film 11 has a central excrescence 10 defining a volume filled with the same polymer material. This excrescence constitutes the seismic mass.

The transducer film also has peripheral excrescence 12 with a circular cross-section 13. This excrescence permits the positioning thereof in a case, as illustrated in FIG. 3, the cylindrical case having two portions 41 and 42 which are to be assembled. The assembly means can be constituted by means 47, 46 and 45 shown in FIG. 3 or any other appropriate means. Each of the half-cases have an annular groove 43 or 44 with a semi-circular cross-section hollowed out of the wall and having the same radius of excrescence 12.

FIG. 3 shows in exploded form a pickup according to the invention placed in its case. Part sections have been made to show the hidden parts.

During the manufacturing process, following moulding, the two faces of the transducer film are metallized to form electrodes 16 and 17. Connecting wires 14 and 15 are then fixed, e.g. by welding to electrodes or by gluing by means of a conductive glue. In the variant of FIG. 3, the two parts of the case are made from an insulating material. A connector is then provided to pass the contacts out of the case. For this purpose, FIG. 3 shows metal plates 48, 49 and a connecting cable 15 incorporating the two conductors 51 and 52 transmits the signals collected at the terminals of the pickup to an appropriate measuring instrument.

Figure 4:
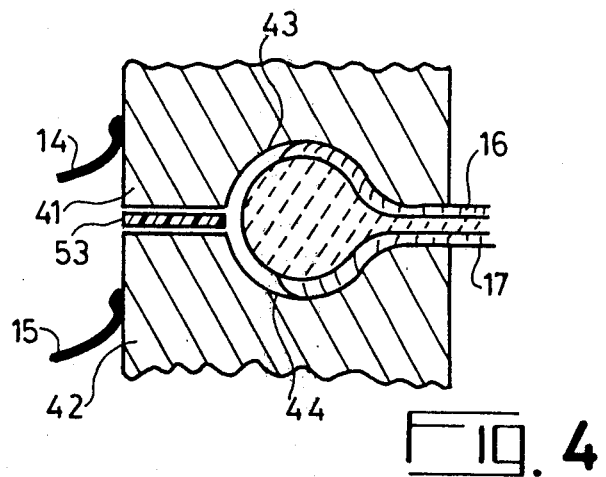

The two-part case can itself have metal parts which, by tightening, directly ensure the contact with the electrodes of the piezoelectric film, as illustrated in FIG. 4. The contact wires 14 and 15 can then be directly fixed to the two parts 41 and 42 of the case, either by welding or by screwing or by any other process. It is also possible to provide an outer insulating joint 53 to prevent any undesired electrical contact between the two parts of the case.

The polymer transducer film undergoes during its manufacture a treatment giving it permanent piezoelectric properties. This treatment has been referred to hereinbefore and in particular comprises an electrical polarization phase by connecting the two electrodes to a high voltage power source able to produce a field of approximately 1 MV/cm, the film then being brought to a temperature between 80° and 120° C. The film is then brought to ambient temperature under an electrical field (for example in 30 minutes).

As this process for obtaining a piezoelectric material is well known in the art, it will not be described in greater detail.

Figure 5:
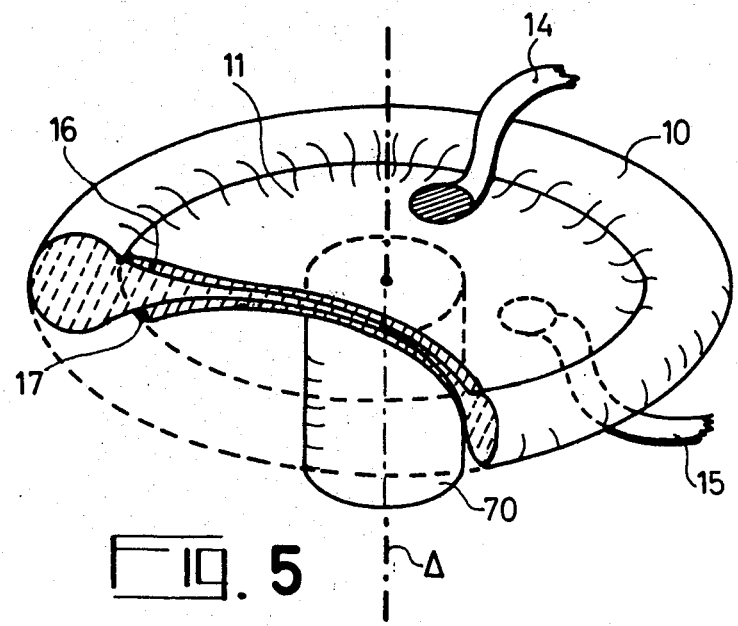
FIG. 5 a second embodiment.

FIG. 5 illustrates a second embodiment of an acceleration pickup according to the invention having a large annular excrescence 10 acting as the seismic mass and made from the same material as the central part 11 which serves as the transducer. Thus, it constitutes the conjugate structure of the pickup of FIG. 2. This structure is self-supporting and is then fixed to a rigid support 70, which can be one of the parts of the case. The assembly has an axis of revolution $\Delta$. This support can be of a conductive material in which case connection 15 is omitted.

Figure 6:
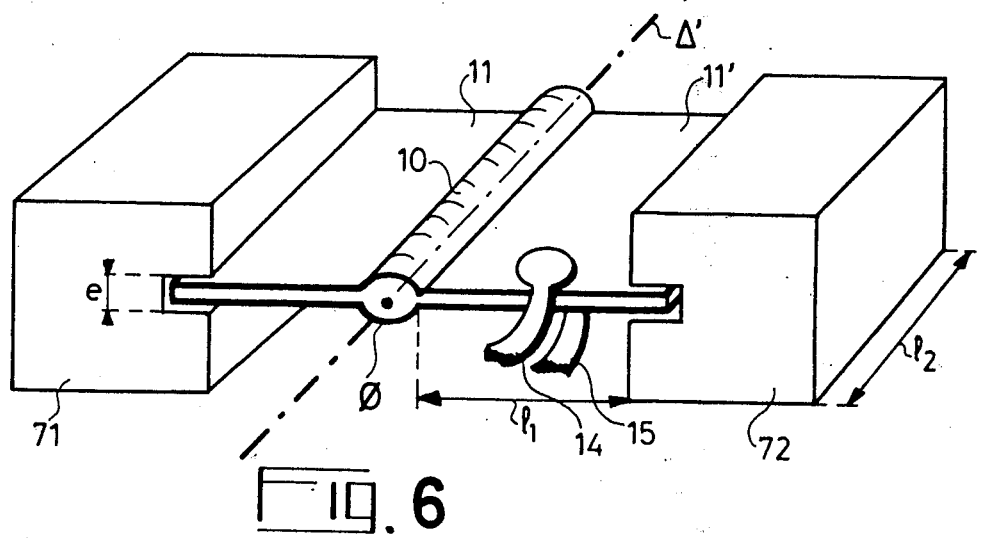
FIGS. 6 and 7 a third embodiment.

FIG. 6 shows a third embodiment according to the first variant of the acceleration pickup according to the invention. The polymer material film is in the form of a parallelepiped 11 and has a central excrescence in the form of a cylinder 10 of section $\Phi$ and of revolution axis $\Delta'$ parallel to the transducer plane 11—11'. This central cylindrical excrescence divides the transducer into two equal parts 11 and 11' gripped at their ends by two rigid supports 71 and 72 fixed to the pickup case.

A numerical example illustrating the operation of the pickup will be developed in connection with this pickup which has a more simple construction than the constructions described hereinbefore.

The seismic mass comprises a cylinder of diameter of $\Phi = 2$ mm and length $l_2 = 1$ cm held on the support by two foils 11 and 11', each having a thickness of 30 $\mu$m and a surface area of $l_1 \times l_2 = 0.5 \times 1$ cm$^2$. The material used is PVF$_2$ and its characteristic parameters are:

compliance: $S = 2.5 \cdot 10^{-10}$ m$^2$ N$^{-1}$
transverse piezoelectric coefficient: $d_{31} = 5 \cdot 10^{-12}$ C N$^{-1}$
specific gravity: $\rho = 1.85 \cdot 10^3$ Kg/m$^3$
dielectric constant: $10^{-10}$ Fm$^{-1}$.

When the device undergoes an acceleration g perpendicular to plane 11—11', it exerts a force F on the seismic mass and the force in the plane of each of the foils 11 and 11' is $$F_1 \neq \left(\frac{F^2}{2s}\right)^{\frac{1}{2}}$$

Figure 7:
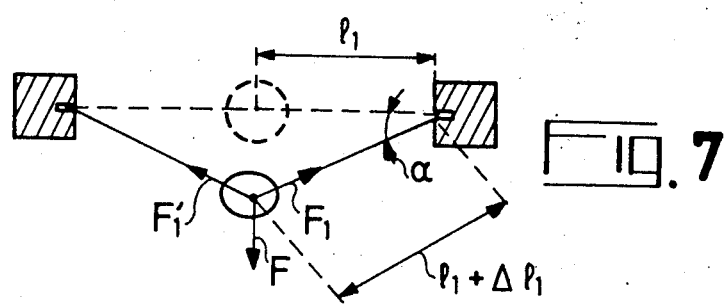

Thus, on referring to the free-body diagrams of FIG. 7, $l_1$ becomes $l_1 + \Delta l_1$ and planes 11 and 11' form an angle $\alpha$ with the horizontal, so that:

$$\cos \alpha = \frac{l_1}{l_1 + \Delta l_1} = \frac{l}{1 + \frac{\Delta l_1}{l_1}} \quad \frac{\Delta l_1}{l_1} = s F_1 \text{ and } F_1 =$$

$$\frac{F}{2 \sin \alpha} \neq \left(\frac{F^2}{2s}\right)^{\frac{1}{2}}$$

For an acceleration of 1 gram force:

$$F = \pi \frac{\phi^2}{4} L \rho = 5.85 \cdot 10^{-5} \text{N}$$

in which $F_1 = 1.89$ N.

This force exerts a pressure X on the edge of each separating foil such that:

$$X = \frac{F_1}{S} = \frac{F_1}{el_1} = 6.3 \cdot 10^5 \text{ Nm}^{-2}$$

The following charge density appears:

$$\rho = Xd = 3.15 \cdot 10^{-6} \text{ C/m}^2$$

Thus, the capacity of planes 11—11' per surface unit is:

$$\gamma = 3.33 \cdot 10^{-6} \text{ Fm}^{-2}$$

Thus, the generated voltage is:

$$V = \frac{\sigma \#}{\gamma} \text{ 1 Volt.}$$

The output voltage of this pickup is not linear but the voltage is high in view of the simplicity of the means used. In numerous applications, no disadvantages result from the non-linearity. As the impedance of the transducer is high, said impedance must be adapted, for example by transmitting the output signal to the input of an MOS FET transistor which can be placed directly in the case containing the pickup. This also applies with the arrangements described hereinbefore. This pickup is particularly advantageous for the detection of vibrations. Its relative inexpensiveness makes it suitable for general public purposes, such as the detection of unbalance of a washing machine drum. Each manufacturer recommends a maximum load of washing to be washed. If this load is exceeded, the drive motor may not operate correctly or may be damaged. The pickup case can be fixed, e.g. by fixing lugs 60 as shown in FIG. 3, to the chassis integral with the movements of the drum. In general, a washing machine has a fixed chassis and a movable chassis supported by shock absorbers, the movable chassis incorporating the rotating drum. The pickup according to the invention makes it possible to detect vibrations of abnormal amplitude due to an exaggerated unbalance of the drum. For such an application, an "all or nothing" response is sufficient and the non-linearity of the pickup is not disadvantageous. If the unbalance exceeds the predetermined standards, the electronic circuits associated with the pickup incorporating an MOS FET transistor transmit to an electrical relay a signal which is sufficient to operate the relay and interrupt the power supply to the motor in the case of an overload. If the drum is able to rotate at several different speeds this safety system can also prevent any change to a higher speed if an overload is detected. The application described hereinbefore is not limited to clothes washing machines and can be extended to all rotary machines of the centrifuge type.

An embodiment according to a second variant will now be described relative to FIG. 8. According to this variant, the pick-up is in the form of a moulded object with a compact construction and, as illustrated in FIG. 8, for example in the form of a cylinder. The electrode necessary for the construction of the transducer part are embedded in polymer material and are constituted by two, flat parallel metal disks 16 and 17. Only the region between these two electrodes of thickness e is made active. To this end, the two electrodes are energised by a high voltage in order to polarize the said region and induce permanent piezoelectric properties in accordance with the processes described hereinbefore. The upper part of the pickup, i.e. the polymer mass over a height h between the upper electrode and the upper face of the pickup constitutes the seismic mass 10.

As a numerical example, the characteristic parameters of the pickup are as follows:

$$\phi = 1 \text{ cm}, h = 1 \text{ cm}, e = 1 \text{ mm}.$$

$$\text{Seismic mass} = \pi \frac{\phi^2}{4} (h - e) \rho = 1.3 \; 10^{-3} \text{Kg}$$

The polymer material is the same as that used for the construction of FIG. 6: thus the pressure is $X = F/S = 66$ N m$^{-2}$.

For an acceleration of 1 gram force and a longitudinal piezoelectric coefficient $d_{33} = 5.10^{-12} \text{CN}^{-1}$, the charge density appearing on the electrodes is: $\sigma = 3.31 \; 10^{-12}$C. Thus, the surface capacity is:

$$\gamma = 10^{-7} \text{ F m}^{-2}$$

so that the voltage at the terminals of electrodes 16 and 17 is:

$$v = 33 \; \mu V.$$

Unlike the previously described pickups, this pickup has no mechanical amplification effect, and its response is much less strong, but it is linear.

As in the previous cases, it is necessary to provide an electronic impedance matching circuit which in the present case must also amplify the signals collected at the terminals of the electrodes. For this purpose, a hybrid circuit module indicated by reference numeral 90 in FIG. 8 is used having as the input stage an MOS FET transistor with a high input impedance. This module can be embedded in the polymer material. Electrical connections 160 and 170 transmit the electrical signals collected at the terminals of electrodes 16, 17 to module 90. This pickup assembly can be inserted into a two-part case 80, 81, having a construction which is identical to that normally used for electrochemical capacitor cases. Connecting cables 91 transmit to the exterior of the pickup case, the signals amplified by module 90 and thus supply the latter with the electric power necessary for its operation. The cables 91 are connected to external circuits for the supply and operation of the thus detected and amplified signals. The case can be fixed by means of a nut 82 to a chassis which is subject to or generates the vibrations to be detected and which contains a hole 83 for fixing purposes. However, any other fixing method can be used and the pickup case can have a random shape optimised for the envisaged application. This falls outside the scope of the present invention.

As a non-limitative example, this inexpensive pickup can also be used for general public applications such as the detection of shocks on closing doors, the detection of impacts between motor vehicles and obstacles, etc.

The invention is not limited to the embodiments described hereinbefore and relates to any application utilising an acceleration pickup.

What is claimed is:

1. An acceleration pickup incorporating a polymer transducer member which has piezoelectric properties after undergoing an appropriate treatment, at least in the polymer material regions between two conductive electrodes at the terminals of which a voltage develops which is displaceable and related to the displacement of a seismic mass subject to an acceleration to be detected, wherein the seismic mass is constituted by at least one predetermined region of the polymer material, wherein said transducer member has the configuration of a film obtained by moulding said polymer material, said film having an excrescence in at least one predetermined region of its surface and said excrescence constitutes the seismic mass, said two conductive electrodes being applied to each side of said film forming said transducer member, and wherein the transducer member has a revolution structure with respect to an axis perpendicular to the plane of said film, said excrescence being in the form of a central dome with the same revolution axis.

2. An acceleration pickup incorporating a polymer transducer member which has piezoelectric properties after undergoing an appropriate treatment, at least in the polymer material regions between two conductive electrodes at the terminals of which a voltage develops which is displaceable and related to the displacement of a seismic mass subject to an acceleration to be detected, wherein the seismic mass is constituted by at least one predetermined region of the polymer material, wherein the transducer member has the configuration of a film obtained by moulding the polymer material, said film having an excrescence in at least one predetermined region of its surface and said excrescence constituting the seismic mass, the two conductive electrodes being applied to either side of the film forming the transducer member, wherein the transducer member has a revolution structure with respect to an axis perpendicular to the plane of the film, the said excrescence being in the form of a peripheral ring with a circular cross-section, whereby the transducer member is mechanically coupled in its central portion to a rigid support and is maintained within a case by said support.

3. An acceleration pickup incorporating a polymer transducer member which has piezoelectric properties after undergoing an appropriate treatment, at least in the polymer material regions between two conductive electrodes at the terminals of which a voltage develops which is displaceable and related to the displacement of a seismic mass subject to an acceleration to be detected, wherein the seismic mass is constituted by at least one predetermined region of the polymer material, wherein the transducer member has the configuration of a film obtained by moulding the polymer material, said film having an excrescence in at least one predetermined region of its surface and said excrescence constituting the seismic mass, the two conductive electrodes being applied to either side of the film forming the transducer member, wherein the transducer member is rectangular and the excrescence is in the form of a cylinder, whose revolution axis is parallel to one of the sides of the rectangle and divides it into two equal parts, each of the ends, parallel to the revolution axis of the two parts, also being held rigidly in a frame.

4. An acceleration pickup incorporating a polymer transducer member which has piezoelectric properties after undergoing an appropriate treatment, at least in the polymer material regions between two conductive electrodes at the terminals of which a voltage develops which is displaceable and related to the displacement of a seismic mass subject to an acceleration to be detected, wherein the seismic mass is constituted by at least one predetermined region of the polymer material, wherein the transducer member is in the form of an elongated cylindrical object obtained by moulding the polymer material and is place by its largest dimension about an axis and wherein the two planar electrodes which face one another in planes perpendicular to the axis are embedded in the polymer material in the vicinity of a first end of said cylindrical transducer, the region of the polymer material between the two electrodes being made active so as to have piezoelectric effects and the region the polymer material between the two electrodes and the second end of said cylindrical transducer constitutes the seismic mass.

5. A pickup according to claim 1, 2 or 3 wherein the two conductive electrodes are constituted in each case by a metal coating deposited on the two faces of the film forming the transducer member.

6. A pickup according to claim 1, wherein the transducer member also has a supplementary excrescence in the form of a solid peripheral ring with a circular cross-section, the transducer being positioned within a case constituted by two rigid half-cases if, at the end of their wall, annular grooves with a semicircular cross-section in which is placed the solid ring, said two half-cases being assembled face to face and maintained in place by fixing means.

7. A pickup according to claim 6, wherein the two half-cases are made from an electrically conductive material, each ensuring an electrical contact with one of the said two electrodes placed on the two faces of the film, a peripheral annular joint electrically insulating the two half-cases from one another after assembly.

8. A pickup according to claim 1, 2, 3 or 4 which also has an electronic matching circuit incorporating at least one high impedance input stage.

* * * * *